United States Patent [19]

Allen

[11] 4,343,142

[45] Aug. 10, 1982

[54] APPARATUS HAVING A VARIABLE ATTITUDE WORK IMPLEMENT

[76] Inventor: David R. Allen, 6744 E. Belmont, Fresno, Calif. 93727

[21] Appl. No.: 144,610

[22] Filed: Apr. 28, 1980

[51] Int. Cl.³ ............................................ A01D 76/00
[52] U.S. Cl. ...................................... 56/377; 56/11.9; 56/DIG. 11; 56/15.5
[58] Field of Search ................ 56/375, 376, 377, 341, 56/342, 343, 11.9, 346, 16.1, DIG. 11, 15.5, 15.4, 15.3

[56] References Cited

U.S. PATENT DOCUMENTS

| | | | |
|---|---|---|---|
| 2,771,306 | 11/1956 | Ash | 56/DIG. 11 |
| 4,077,189 | 3/1978 | Hering | 56/377 |
| 4,173,110 | 11/1979 | Hansen | 56/11.9 |

FOREIGN PATENT DOCUMENTS 2356623  5/1974  Fed. Rep. of Germany ........ 56/376

Primary Examiner—R. Hafer
Attorney, Agent, or Firm—Huebner & Worrel

[57] ABSTRACT

An apparatus having a frame adapted for earth traversing movement in a direction of travel and having a portion laterally positionable with respect to the direction of travel, a work assembly pivotally mounted on the laterally positionable portion of the frame for movement therewith, and an arm interconnecting the work assembly and the frame to pivot the work assembly through a plurality of positions relative to the direction of travel as the portion of the frame is laterally positioned.

20 Claims, 11 Drawing Figures

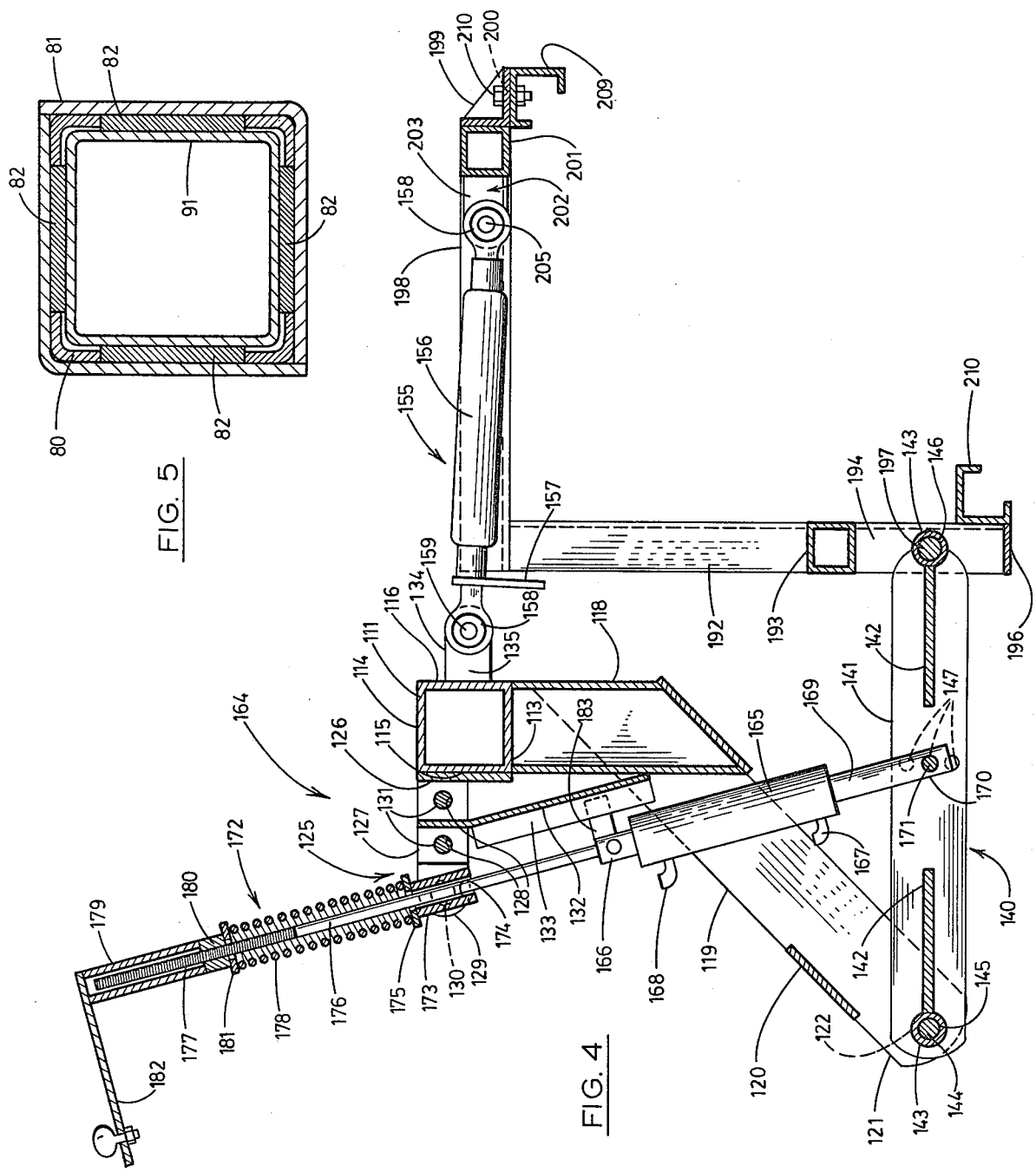

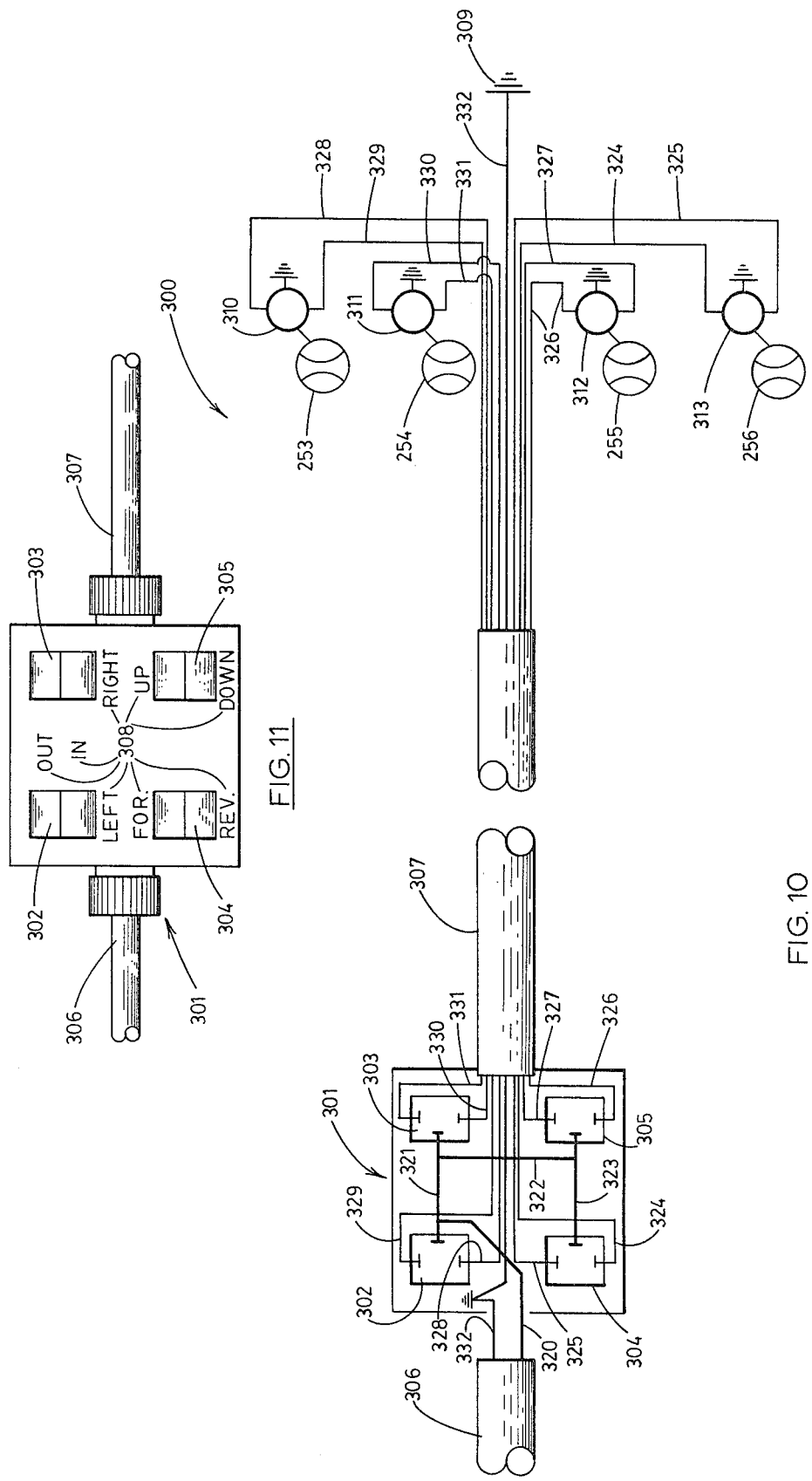

APPARATUS HAVING A VARIABLE ATTITUDE WORK IMPLEMENT

BACKGROUND OF THE INVENTION

1. Field of the Invention

The present invention relates to an apparatus which can be employed in a variety of embodiments specifically adapted to areas of use where one or more work implements must periodically be adjusted relative to a direction of travel to attitudes suited to the performance of different work operations and more particularly to such an apparatus which can be so adjusted conveniently and expeditiously without disassembly thereof.

2. Description of the Prior Art

In the raking of hay, beans and other crops, in the collection of such crops as nuts and in a host of other environments, it is frequently necessary to adjust the work implements of the equipment relative to each other and to the direction of travel for achieving a specific operative result. For example, in the harvesting of hay, the crop after cutting lays in the field for curing or drying prior to being picked up by a hay baler. Depending upon the specific variety of hay crop involved and the prevailing climatic conditions, it is common practice to turn the crop one or more times during the drying process to expose more of the crop for drying, to release the moisture therefrom, and generally to aerate the material as it lays in the field. Such turning is performed by a variety of different raking operations individually suited to the drying conditions. Subsequent to drying, the hay is raked into windrows for retrieval from the field by a hay baler.

Such raking operations are performed by one or more hay rakes arranged in a formation and in attitudes with respect to the direction of travel suited to the specific operation to be performed. However, it has been necessary substantially to modify the formation and attitudes whenever a different type of raking operation is to be performed. Thus, it is necessary where a pair of hay rakes are employed to disconnect the rakes from the tool bar and reposition them relative to each other and to the direction of travel for the specific raking operation to be performed. In other instances, it is necessary to disassemble portions of the rakes themselves and to restructure them so that they are capable of performing the operation desired. Such repositioning and rebuilding is not only tedious and time consuming and therefore expensive, but it is often difficult to perform with the precision and dependability that would be desired since frequently the rakes are not designed for the specific arrangement required.

Similarly, the substantial width of such rakes or formations of rakes interferes with movement along roadways to and from the field. While it is known to rear-range two or more rakes in trailing relation to each other for road transport, such rearrangement is inconvenient, time consuming and cumbersome at best. In other instances the rakes cannot be rearranged therefore prohibiting road travel at least without the creation of a hazardous condition.

Therefore, it has long been known that it would be desirable to have an apparatus having one or more work implements which can be adjusted relative to each other and a direction of travel for the performance of a specific work operation; which can conveniently be adjusted without substantial rearrangement or disassembly of the work implements; which is adaptable to a wide variety of specific work implements; and which can be employed to perform a wide variety of work operations with the work implement thereof so as to eliminate the necessity for maintaining more than one such apparatus.

SUMMARY OF THE INVENTION

Therefore, it is an object of the present invention to provide an apparatus having a variable attitude work implement.

Another object is to provide such an apparatus which can be constructed in a variety of specific embodiments for the performance of such operations as raking hay, beans, grain, and other such crops; sweeping nut crops, figs and the like for collection during harvesting; sweeping dirt, trash and the like for collection and disposal; and a host of other applications.

Another object is to provide such an apparatus which is particularly well suited to use in the form of a dual hay rake having independently positionable hay rakes which are both laterally separable and independently movable into selected attitudes relative to the direction of travel.

Another object is to provide such an apparatus which can be operated to adjust the work implements thereof during continuous movement along a path of travel and without disassembly or manual repositioning of the work implements.

Another object is to provide such an apparatus which has a range of adjustment from a narrow configuration adapted for road transport to a fully expanded configuration capable of performing virtually any work operation in the environment to which the embodiment of the apparatus is adapted.

Another object is to provide such an apparatus in which the work implements are independently adjustable relative to several different axes without disassembly or substantial manual readjustment.

Another object is to provide such an apparatus which possesses a fully integrated hydraulic control system for performing all of the functions thereof and without dependence upon ground drive for operation of the work implements.

Further objects and advantages are to provide improved elements and arrangements thereof in an apparatus for the purposes described which is dependable, economical, durable and fully effective in accomplishing its intended purposes.

BRIEF DESCRIPTION OF THE DRAWINGS

FIG. 4 is a somewhat enlarged, fragmentary, transverse vertical section taken on line 4—4 in FIG. 1.

FIG. 5 is a somewhat further enlarged transverse vertical section of a tubular beam of the main frame of the apparatus showing the slide portion of the leg assembly thereof and taken on line 5—5 in FIG. 1.

FIG. 10 is a fragmentary schematic diagram of the electrical system of the apparatus of the present invention.

FIG. 11 is a fragmentary plan view of the control unit of the electrical system.

DESCRIPTION OF THE PREFERRED EMBODIMENT

Figure 1:
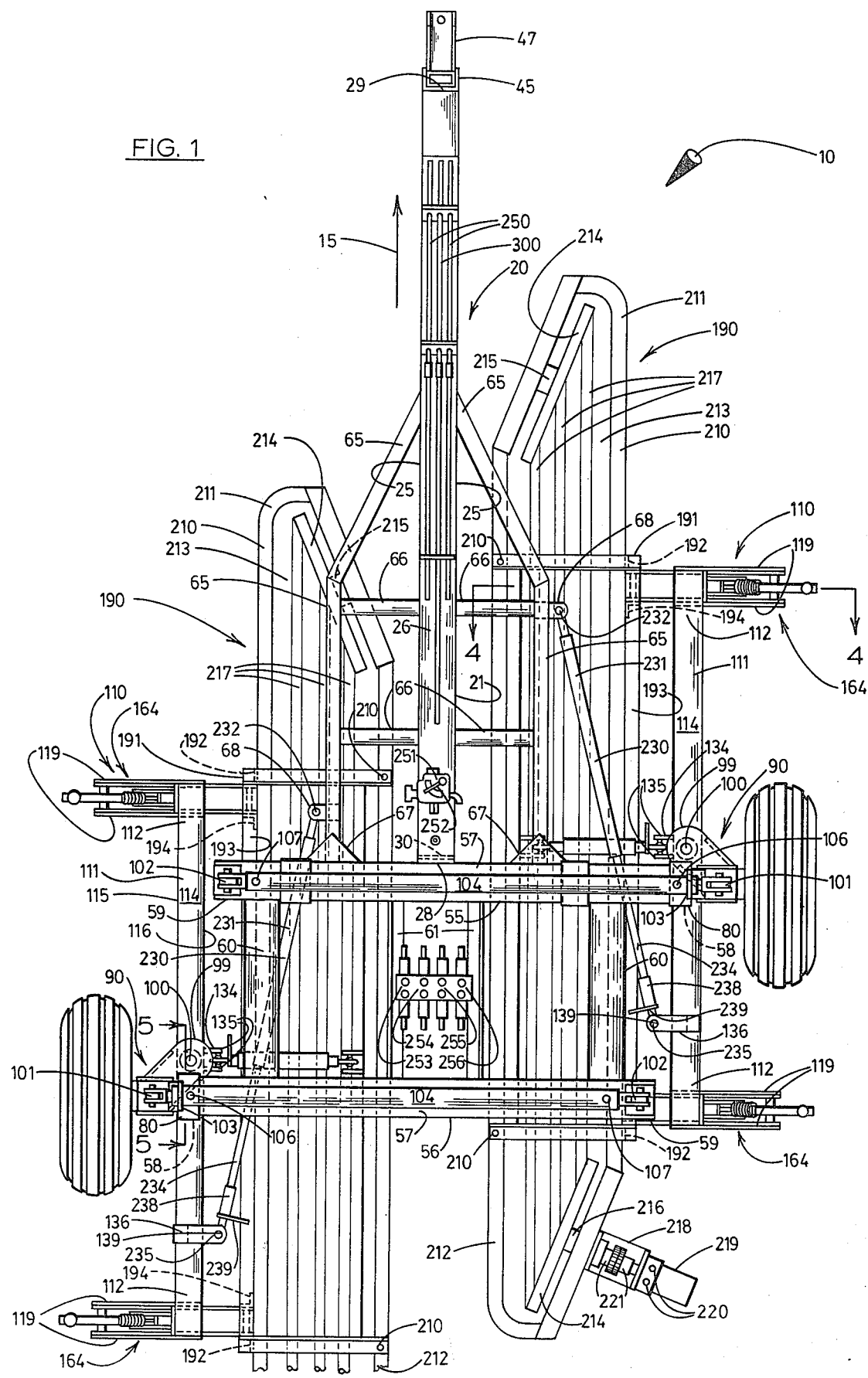
FIG. 1 is a fragmentary top plan view of the apparatus of the present invention showing the work implements thereof disposed in side-by-side relation suited to road travel and with the hydraulic and electrical control systems shown fragmentarily for illustrative convenience.

Referring more particularly to the drawings, the apparatus of the present invention is generally indicated by the numeral 10 in FIG. 1. For illustrative convenience, the embodiment of the apparatus shown and described herein is a hay rake. However, it will be understood that the apparatus of the present invention is fully adaptable to a variety of specific embodiments wherein one or more work implements must be adjusted from one attitude to another relative to each other or to a direction of travel.

As shown in the drawings, the earth surface, in this case a field, is generally indicated at 11 on which hay 12 which has been cut lays in windrows 13. A tractor is generally indicated at 14 adapted to tow the apparatus through the field and along roadways, as will hereinafter be described. It will be understood that the tractor, in accordance with common construction, has a self-contained hydraulic system, not shown, for powering implements pulled by the tractor. For this purpose the tractor has a pair of couplings communicating with the hydraulic system for the connection of the hydraulic lines of such an implement thereto. When towed by the tractor during normal operation, the apparatus is moved in a direction of travel toward the right as viewed in FIG. 2 as indicated by arrow 15.

The apparatus 10 has a central or main frame 20 having a central tubular beam 21. The central tubular beam has a horizontal segment 22, a sloped segment 23 and a front segment 24. The segments of the beam are welded together in the configuration best shown in FIG. 2 wherein the sloped segment extends diagonally downwardly from the horizontal segment to the front segment. The central tubular beam has opposite sides 25, an upper side 26 and a lower side 27. The central tubular beam has a rear end 28 and an opposite front end 29 relative to the direction of travel indicated by arrow 15.

Figure 2:
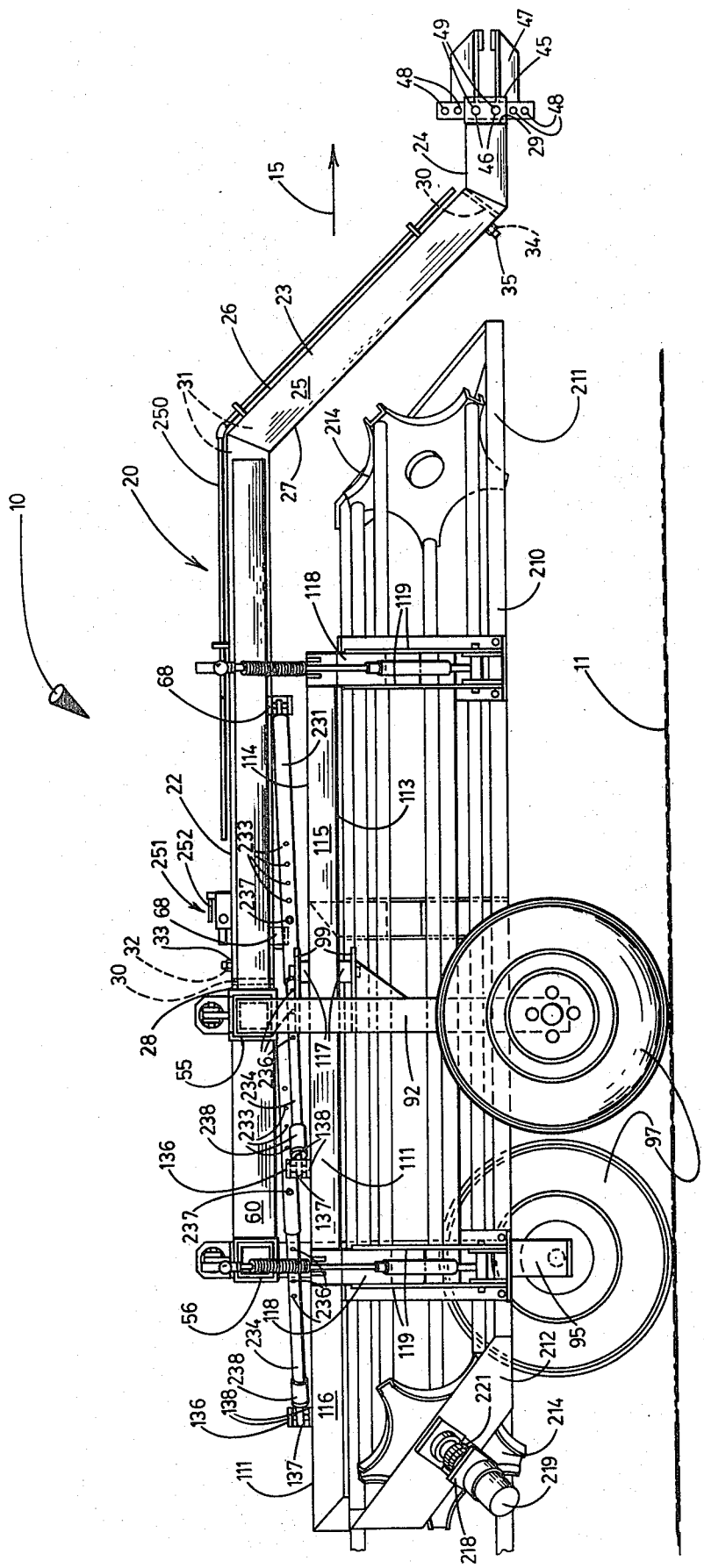
FIG. 2 is a fragmentary side elevation of the apparatus arranged in the configuration shown in FIG. 1.

As can best be seen in FIG. 2, a pair of internal sealing walls 30 are mounted within the central tubular beam to define an hydraulic fluid reservoir 31 within the tubular beam. Preferably one of the walls is mounted adjacent to the rear end 28 of the tubular beam and the other wall is mounted in the forward portion of the sloped segment 23. A filler opening 32 is provided in the upper side 26 of the horizontal segment 22 of the central tubular beam and is sealed by a removable plug 33. Similarly, a drain opening 34 is provided in the lower side 27 of the tubular beam and is sealed by a removable plug 35. The hydraulic fluid reservoir is normally used only where the tractor 14 does not have its own hydraulic system for operating implements towed by the tractor. In such case, an hydraulic pump, not shown, is attached in driven relation to the power take off shaft of the tractor and the pump, hydraulic fluid reservoir and other operative elements of the apparatus interconnected by a conduit system for powering the apparatus. Where, as in the preferred embodiment herein shown and described, the tractor has its own available hydraulic system, the hydraulic fluid reservoir 31 is normally not used but is available should the need arise.

A channel member 45 is affixed on the front end 29 of the central tubular beam 21 and has a plurality of holes 46 extended therethrough. A hitch 47, having holes 48, is fitted within the channel member 45 and held in selected position by bolt and nut assemblies 49 extending through matching sets of holes 46 and 48.

The main frame 20 has spaced, substantially parallel first and second tubular members or beams 55 and 56 respectively. Each of the tubular beams 55 and 56 has an upper surface 57, a mouth portion 58 and an opposite end portion 59. The respective mouth portions of the first and second tubular beams face in opposite directions laterally of the apparatus, as best shown in FIG. 1. The tubular beams 55 and 56 are preferably of the square section type and are interconnected by a pair of longitudinal beams 60 extending therebetween in spaced, substantially parallel relation. A pair of angle iron members 61 are mounted on and extend in right angular relation to and between the first and second tubular beams in spaced, substantially parallel relation. The first tubular beam is mounted, as by welding, on the rear end 28 of the central tubular beam 21 so that the first and second tubular beam are disposed in right angular relation to the central tubular beam.

A pair of channel members 65 are individually mounted, as by welding, on the opposite sides 25 of the horizontal segment 22 of the central tubular beam 21 and are secured at their rearwardmost ends on the first tubular beam 55 on opposite sides of the central tubular beam. Brace members 66 are affixed on and interconnect the horizontal segment 22 of the central tubular beam 21 and the channel member 65 on opposite sides thereof. A pair of gusset plates 67 are individually affixed on the first tubular beam in bracing relation to the channel members 65 on opposite sides of the central tubular beam, as best shown in FIG. 1. A pair of arm mounts 68 are individually secured on the underside of the channel members 65. The arm mounts are off set relative to each other in the relationship best shown in FIG. 1. Each arm mount has a block 69 having a pair of forwardly extending flange plates 70 pierced by vertically aligned holes 71.

A bearing housing 80 is mounted on each of the tubular beams 55 and 56 extending about the mouth portion 58 thereof. A bearing ring 81 is mounted within the bearing housing and, in turn, mounts four polyethylene bearing pads or bearings 82, as best shown in FIG. 5.

Figure 3:
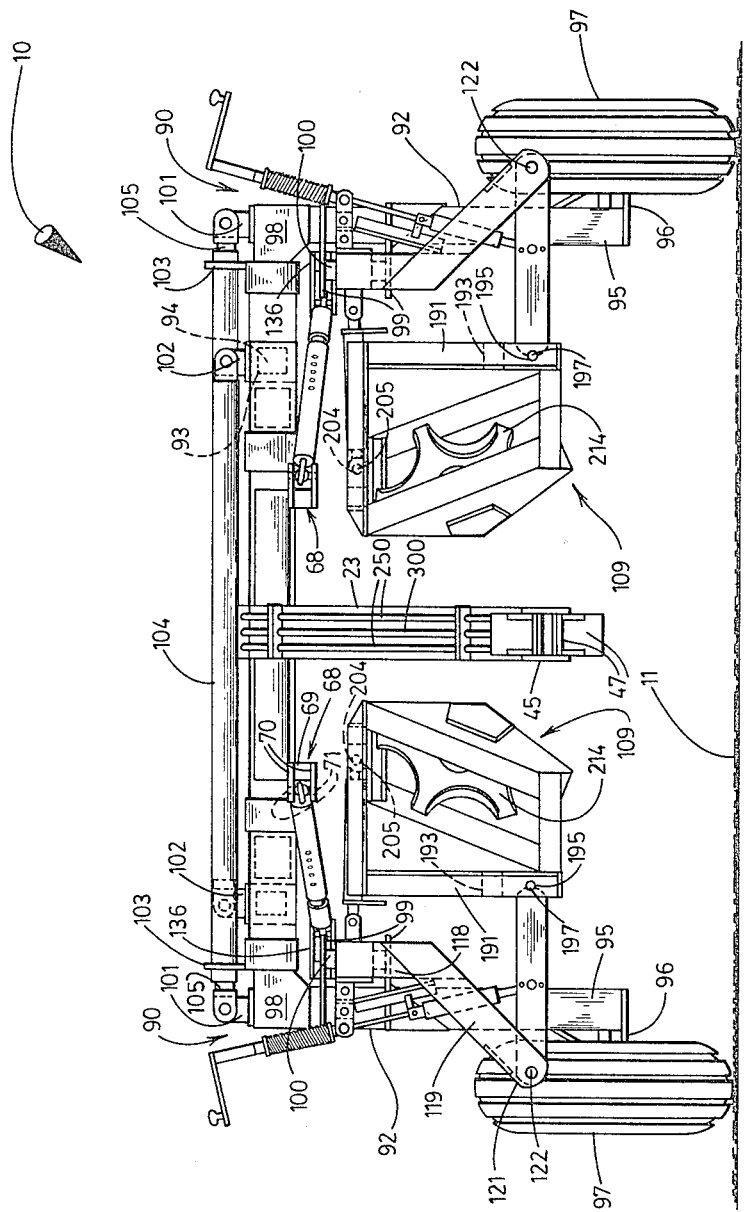
FIG. 3 is a front elevation of the apparatus arranged in the configuration shown in FIGS. 1 and 2.

A pair of supporting frames or leg assemblies 90 are individually mounted on the first and second tubular beams 55 and 56 respectively. Each leg assembly has an elongated tubular slide portion 91 and a leg portion 92 right-angularly related to the slide portion at one end thereof. The slide portion of each leg assembly has an interior end portion 93 mounting four polyethylene bearing pads or bearings 94. The slide portion 91 of each leg assembly is slidably received in one of the tubular beams 55 or 56. The polyethylene bearings 82 of its tubular beam engage the slide portion 91 and the polyethylene bearings 94 of the slide portion engage the interior of the tubular beam to faciliate slidable movement of the slide portion within its respective tubular beam. The leg portion 92 of each leg assembly has a lower end portion on which is secured a laterally extending wheel mount 96. A wheel assembly 97 is journaled on the wheel mount for rotational movement, as can best be seen in FIG. 3. A pair of brace plates 98 are weldably secured at the juncture of the slide portion and leg portion of each leg assembly for purposes of reinforcement. A pair of mounts 99 are affixed, as by welding, in spaced relation on the leg portion 92 of each leg assembly adjacent to the brace plates 98 thereof. The mounts extend in spaced, substantially parallel relation to the slide portion 91 of the leg assembly and inwardly of the apparatus, as best shown in FIGS. 1, 2 and 3. A pivot shaft or spindle 100 is mounted on and extends between the mounts of each pair 99 adjacent and substantially parallel to the leg portion 92 thereof.

An arm mount 101 is secured on each leg assembly 90 in upstanding relation above the leg portion thereof. A rear cylinder mount 102 is mounted on the opposite end portion 59 of each tubular beam 55 and 56 in upstanding relation. A front cylinder mount 103 is affixed on the bearing housing 80 of each tubular beam 55 and 56. A primary hydraulic cylinder 104 having a cylinder arm 105, is mounted on the front and rear cylinder mounts of each tubular beam with the cylinder arm thereof fastened on the arm mount 101 of the leg assembly of its respective tubular beam. Each primary hydraulic cylinder has a contraction coupling 106 adjacent to the cylinder arm and an expansion coupling 107 remote from the cylinder arm thereof. In the conventional manner, the pressurized introduction of hydraulic fluid to the interior of the hydraulic cylinder through the contraction coupling causes the cylinder arm to be retracted within the hydraulic cylinder. The pressurized introduction of hydraulic fluid to the interior of the hydraulic cylinder through the expansion coupling 107 causes the cylinder arm to be extended from the hydraulic cylinder. As can best be visualized in FIGS. 1 and 3, expansion and alternatively contraction of the primary hydraulic cylinders causes the leg assemblies thereof to be correspondingly moved outwardly and alternatively inwardly along paths extending laterally of the main frame 20 in opposite directions normal to the direction of travel indicated by arrow 15.

A work assembly 109 is mounted on the spindle 100 of each leg assembly 90. Each work assembly has a subframe 110 having a subframe beam 111 with opposite end portions 112. The subframe beam has a lower surface 113 and an opposite upper surface 114. The subframe beam has an outer surface 115 and an inner surface 116 with respect to the apparatus 10. A bearing assembly 117 is mounted on and extends through the subframe beam 111 substantially centrally thereof communicating with the upper and lower surfaces 113 and 114. Each subframe beam is pivotally mounted on the spindle 100 of its respective leg assembly with the spindle thereof extending through the bearing assembly 117. Thus, each of the subframes and accordingly each work assembly 109 is mounted on its respective leg assembly for pivotal movement about a substantially vertical axis of rotation defined by the spindle on which it is mounted.

Each opposite end portion 112 of each subframe beam 111 mounts an end beam 118 on its lower surface 113 extending downwardly therefrom. A pair of diagonal plates 119 are mounted, as by welding, on opposite sides of each end beam extending downwardly and outwardly relative to the apparatus in substantially parallel relation. The diagonal plates are weldably interconnected by a brace plate 120 and have remote end portions 121 with aligned holes 122 extending therethrough.

As best shown in FIG. 4, a cylinder mounting assembly 125 is fastened on each opposite end portion 112 of each subframe beam 111 on the outer surface 115 thereof above the diagonal plates 119. Each mounting assembly has a mounting plate 126 secured on the beam in the position described and having a pair of mounting flanges 127 extending outwardly therefrom in spaced, substantially parallel relation. The mounting flanges have corresponding holes 128. A pair of cylinder mounting plates 129, having corresponding holes 130, are affixed on the mounting flanges 127 by bolt and nut assemblies 131. A cylinder guide 132 is mounted on and extends between the mounting flanges 127 and downwardly therefrom. The cylinder guide is T-shaped in cross section so as to provide an outwardly facing guide flange 133.

A linkage mount 134 is borne by the inner surface 116 of each subframe beam 111 midway between the opposite end portions 112 of the beam and immediately adjacent to the bearing assembly 117, as can best be seen in FIG. 1. Each linkage mount has a pair of spaced, substantially parallel flange plates 135. An arm mount 136 is secured on the upper surface 114 of each subframe beam 111 in adjacent spaced relation to the rearwardmost end portion 112 of the subframe beam relative to the direction of travel indicated by arrow 15. Each arm mount has a block 137 from which a pair of flange plates 138 are extended in spaced relation. Vertically aligned holes 139 extend through the flange plates.

A pair of lower links or linking arms 140 are individually mounted on the diagonal plates 119 of each subframe 110. Each lower linking arm is composed of a pair of spaced, substantially parallel side plates 141 interconnected by a pair of brace plates 142 extended therebetween. A bearing sleeve 143 is mounted on and extends through the side plates adjacent to each opposite end of each linking arm, as best shown in FIG. 4. The brace plates are welded to the bearing sleeves for purposes of reinforcement. A bolt and nut assembly 144 extends through the holes 122 of each pair of diagonal plates 119 of each lower linking arm and through the bearing sleeve thereof, corresponding to the bearing sleeve, on the left as viewed in FIG. 4, to mount each lower linking arm for pivotal movement thereabout. Each bolt and nut assembly thus defines a first pivot point 145 for its respective lower linking arm. Similarly, the bearing sleeve of each lower linking arm corresponding to the bearing sleeve on the right as viewed in FIG. 4 defines a second pivot point 146 for each lower linking arm. A plurality of cylinder attachment holes 147 are provided in corresponding positions in the side plates 141 preferably at positions nearer to the second pivot point than to the first pivot point.

An upper link or linking arm 155 is mounted on each subframe 110. Each upper linking arm has an endwardly adjustable assembly 156 operated by adjustment lever 157 to shorten or lengthen the relative length of the upper linking arm by screw threaded endward adjustment of the components thereof. Each upper linking arm has swivel joints 158 at the opposite ends of the assembly 156, as best shown in FIG. 4. One of the swivel joints 158 is mounted on the linkage mount 134 between the flange plates 135 thereof by a pin 159 extending through the swivel joint and through the flange plates, as best shown in FIG. 4. The pair of lower linking arms 140 and the upper linking arm 155 of each subframe 110 constitute a linkage for that subframe.

Each subframe 110 mounts a pair of secondary hydraulic cylinder assemblies 164. Each secondary hydraulic cylinder assembly has a secondary hydraulic cylinder 165. As can best be seen in FIG. 4, the hydraulic cylinder is of relatively short length so as to afford, in operation, a relatively short range of movement for purposes hereinafter to be described. Each secondary hydraulic cylinder has a mount 166, a contraction coupling 167 and an expansion coupling 168. The secondary hydraulic cylinder has a cylinder arm 169 having a remote end portion 170. In the conventional manner the introduction of hydraulic fluid under pressure to the interior of the cylinder through the contraction coupling causes the cylinder arm to be drawn into the cylinder and through the expansion coupling causes the cylinder arm to be extended from the cylinder. The remote end portion of the cylinder arm is attached to its respective lower linking arm 140 by a pin 171 extending through the remote end portion of the cylinder arm and through selected corresponding cylinder attachment holes 147.

Each secondary hydraulic cylinder assembly 164 has an adjustment assembly 172. The adjustment assembly consists of a shaft guide 173 mounted for pivotal movement in corresponding holes 130 of the cylinder mounting plates 129. The shaft guide has an axial passage 174 and an upwardly facing flange 175 concentric to the passage 174. An elongated shaft 176 is fastened on the mount 167 in axial alignment with the secondary hydraulic cylinder 165 and extending upwardly therefrom through the passage 174 of the shaft guide 173, as best shown in FIG. 4. The shaft has a remote, externally screw threaded portion 177. A compression spring 178 is received about the shaft in rested engagement on the flange 175 of the shaft guide 173. A crank 179, having an internally screw threaded portion 180, is screw threadably mounted on the screw threaded portion 177 of the shaft. The crank has a downwardly facing flange 181 concentric to the internal screw threaded portion 180 and engaging the compression spring 178. The crank mounts a handle 182. Thus, it will be seen that by operation of the crank handle, the screw threaded portion 177 of the shaft is adjusted inwardly or outwardly of the crank 178 thereby raising or lowering the lower linking arm 140 supported by the secondary hydraulic cylinder. A flange 183 is affixed on the mount 166 extending to a position in side-by-side relation to the guide flange 133 of the cylinder guide 132. The flanges 133 and 183 cooperate to guide movement of the hydraulic cylinder upwardly and downwardly under the control of the crank 179.

A work implement, in the illustrative embodiment a rotary hay rake 190 is supported on the lower linking arms 140 and upper linking arm 155 of each subframe 110. Each work implement has an adaptor frame 191 having a pair of spaced, substantially parallel vertical members 192 interconnected by a cross member 193 spaced upwardly from the lower ends of the vertical members a relatively short distance. A pair of angle iron members 194 are mounted, as by welding, on the cross member 193 in predetermined adjacent spaced relation inwardly of and parallel to the lower ends of the vertical members. Each of the angle iron members and its respective adjacent vertical member have corresponding holes 195 defining an axis parallel to the cross member 193. The lowermost ends of each angle iron member and adjacent vertical member are interconnected by a bottom plate 196. As can, perhaps, best be seen in FIG. 4, the bearing sleeve 143 of the second pivot point 146 of each lower linking arm 140 is received between one of the angle iron members and its respective adjacent vertical member so that the holes 195 are aligned with the sleeve. A bolt and nut assembly 197 extends through the sleeve and the holes 195 at each end of the adaptor frame to mount the adaptor frame 191 for pivotal movement on the lower linking arms 140 about the second pivot points 146 thereof.

Each adaptor frame 191 has a pair of top members 198 borne by the uppermost ends of the vertical members 192 and extending inwardly of the apparatus 10 to inner end portions 199 each having a hole 200 therein. A cross beam 201 is mounted on and interconnects the inner end portions 199 of the top members. A linkage mount 202, having a pair of flange plates 203 with aligned holes 204, is secured on the cross member 201 midway between the top members and faces toward the subframe 110. A pin 205 extends through the holes of the flange plates and through the available swivel joint 158 of the upper linking arm 155 to mount the adaptor frame 191 in depending relation on the subframe, as best shown in FIG. 4.

Each work implement 190 has an implement frame 209 mounted on the top members 198 of the adaptor frame 191 by bolt and nut assemblies 210 extending through the holes 200 of the top members. The implement frame has a front end portion 211 and an opposite, rear end portion 212 with respect to the intended direction of travel. Raking reel 213 of conventional construction is mounted for rotational movement in the conventional manner on and within the implement frame. The raking reel has a pair of star wheels 214 one of which is mounted on the implement frame by a front rotary mount 215 and the other of which is mounted in the rear end portion of the implement frame by the rear rotary mount 216. The star wheels 214 of each raking reel are interconnected by a plurality of tine bars 217 mounting raking tines, not shown, for operation in the conventional fashion.

An hydraulic motor mount 218 is secured on the rear end portion 212 of the implement frame 209 in alignment with the rear rotary mount 216. An hydraulic motor 219, having hose connections 220, is mounted on the motor mount and is connected in driving relation to the rear rotary mount by a drive linkage 221.

A pivot arm 230 interconnects each arm mount 68 and its respective arm mount 136 of the adjacent subframe 110, as best shown in FIG. 1. Each pivot arm has a forward tubular portion 231 which is pivotally mounted on the arm mount 68 by a pin assembly 232. The forward tubular portion has a plurality of holes 233 extending therethrough along its length. Each pivot arm has a rearward tubular portion 234 which is slidably received within the forward tubular portion 231 of that pivot arm and is pivotally mounted on the arm mount 136 of its respective subframe 110 by a pin assembly 235. The rearward tubular portion has a plurality of holes 236 which extend along the length thereof and which correspond to the holes 233 of the forward tubular portion. A removable pin assembly 237 is extended through selected corresponding holes 233 and 236 of the tubular portions to lock the tubular portions in selected positions and thereby define a pivot arm of the desired length. The rearward tubular portion has a fine adjustment assembly 238 therein. The fine adjustment assembly has screw threadably interconnected portions which are endwardly adjusted relative to each other by a lever 239 to adjust the length of the pivot arm. This permits slight increases or decreases in the overall length of the pivot arm.

Figure 9:
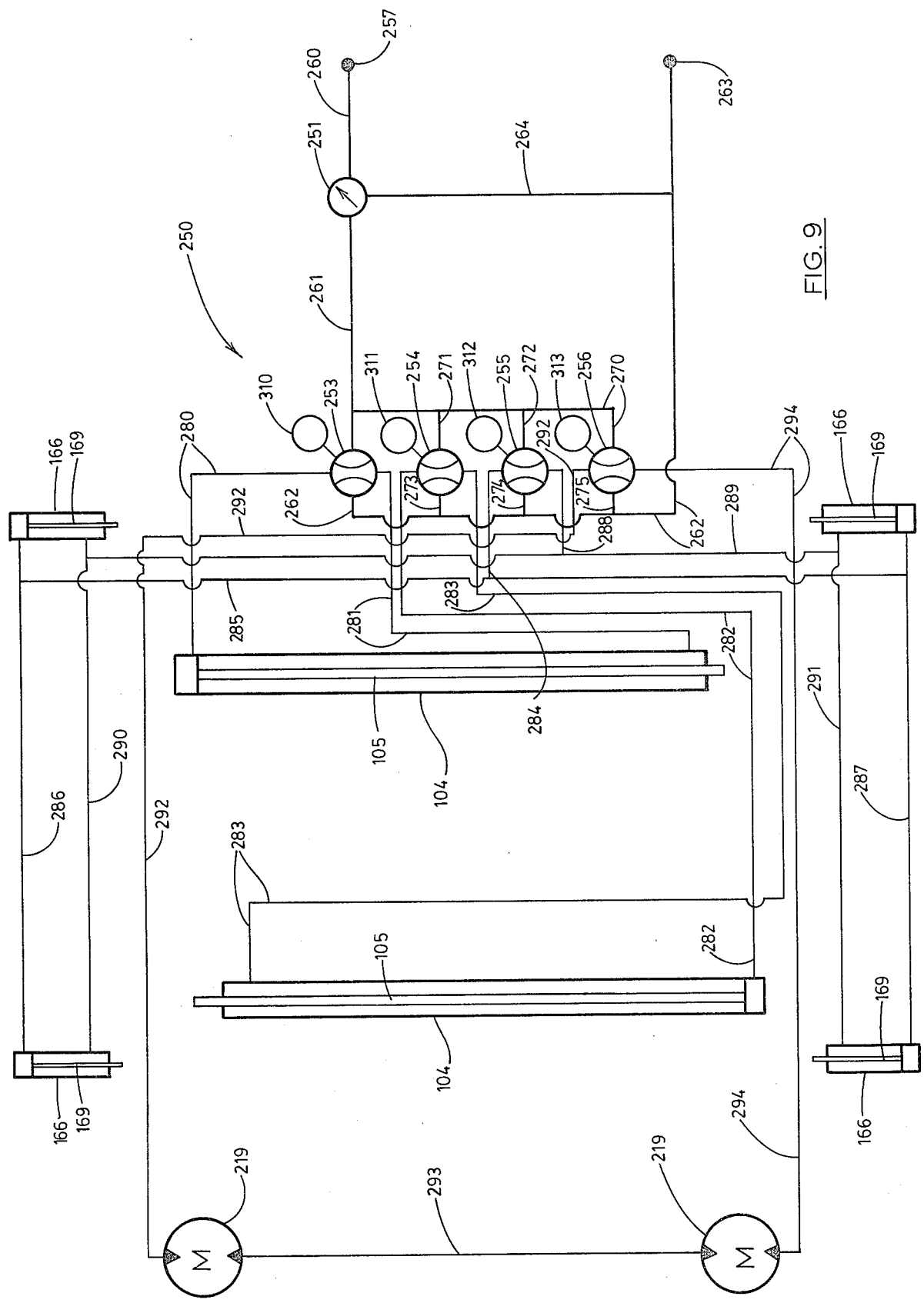
FIG. 9 is a schematic diagram of the hydraulic system of the apparatus of the present invention.

The hydraulic system for the apparatus 10 of the present invention is generally indicated by the numeral 250 and is shown in the schematic diagram of FIG. 9. It will be apparent that a variety of hydraulic systems cam be employed for operating the apparatus. The hydraulic system 250 is intended as a representative example of one such arrangement. However, the hydraulic system 250 is uniquely well suited to operation of the apparatus as will hereinafter be discussed. The hydraulic system has a flow control valve 251 which is preferably mounted on the horizontal segment 22 of the central tubular beam 21 of the main frame 20. The flow control valve has a control lever 252 which is operable to control the volume of hydraulic fluid passed therethrough and into the remainder of the hydraulic system as will be described. The flow control valve is operable with the control lever in a closed position to prevent the passage of hydraulic fluid into the hydraulic system. With the control lever in a fully opened position, all or nearly all of the hydraulic fluid received thereby is directed into the hydraulic system. Positioning of the control lever at a position between these open and closed positions allows the operator to select the exact volume of hydraulic fluid to be passed into the hydraulic system and therefore the speed of operation of the various components operated by the hydraulic system. First, second, third and fourth control valves 253, 254, 255 and 256 respectively are mounted on the pair of angle iron members 61 of the main frame 20. The control valves are of the type adapted to be operated by electric solenoids. The hydraulic system has a coupling 257 which is adapted for connection to one of the hydraulic couplings, not shown, of the hydraulic system of the tractor 14.

The hydraulic system 250 includes a system of hydraulic conduits operatively interconnecting the various hydraulic components of the apparatus 10. Thus, an hydraulic conduit 260 interconnects coupling 257 and the flow control valve 251 in fluid supplying relation. A conduit 261 interconnects the flow control valve 251 and the first control valve 253. A conduit 262 operatively interconnects the first control valve 253 and a coupling 263 adapted for connection to the other of the hydraulic couplings, not shown, of the hydraulic system of the tractor 14. A conduit 264 serving as a bypass operatively interconnects the flow control valve 251 and the conduit 262 for the return of hydraulic fluid therethrough to the hydraulic system of the tractor. Thus, when the hydraulic system of the tractor is in operation with the hydraulic system 250 of the apparatus connected thereto by way of the couplings 257 and 263 and when the control lever 252 of the flow control valve 251 is not in its fully opened position, the hydraulic fluid not passing through the flow control valve into the hydraulic system, 250 is diverted by the flow control valve through conduit 264 and conduit 262 for recirculation back through the hydraulic system of the tractor.

The hydraulic system 250 has a conduit 270 which interconnects conduit 261 and the fourth control valve 256. A conduit 271 interconnects conduit 270 and the second control valve 254. A conduit 272 interconnects the conduit 270 and the third control valve 255. A conduit 273 interconnects the second control valve 254 and the conduit 262. A conduit 274 interconnects the third control valve 255 and the conduit 262. A conduit 275 interconnects the fourth control valve 256 and the conduit 262. Thus, the control valves 253, 254, 255 and 256 are linked in parallel in the hydraulic system between conduits 270 and 262. When the flow control valve 251 is in an opened position and any or all of the control valves are in operative positions interconnecting conduits 270 and 262, hydraulic fluid is simply circulated through those valves and back into the hydraulic system of the tractor with no operative effect on the apparatus 10.

An hydraulic conduit 280 interconnects the first control valve 253 and the expansion coupling 107 of the primary hydraulic cylinder 104 mounted on the first tubular beam 55. An hydraulic conduit 281 interconnects the first control valve 253 and the contraction coupling 106 of the same primary hydraulic cylinder 104 mounted on the first tubular beam 255. An hydraulic conduit 282 interconnects the second control valve 254 and the expansion coupling of the primary hydraulic cylinder 104 mounted on the second tubular beam 56. A conduit 283 interconnects the second control valve 254 and the contraction coupling 106 of the primary hydraulic cylinder mounted on the second tubular beam.

An hydraulic conduit 284 is connected to the third control valve 255. A conduit 285 is operatively connected to the conduit 284. A conduit 286 is connected to one end of conduit 285 and is itself connected to the expansion couplings 168 of the secondary hydraulic cylinders 165 on the left as viewed in FIG. 1. A conduit 287 is connected to the opposite end of the conduit 285 and is itself connected to the expansion couplings 168 of secondary hydraulic cylinders 165.

An hydraulic conduit 288 is connected to the third control valve 255. Conduit 289 is connected to conduit 288. Conduit 290 is connected to conduit 289 and is itself connected to the contraction couplings 167 of the secondary hydraulic cylinders 165 on the left as viewed in FIG. 1. Conduit 291 is connected to the other end of conduit 289 and is itself connected to the contraction couplings 167 of secondary hydraulic cylinders 165 on the right as viewed in FIG. 1. Thus, the third control valve 255 is operable to control the expansion and contraction of the secondary hydraulic cylinders 165.

An hydraulic conduit 292 is connected to the fourth control valve 256 and is connected at the other of its ends to the hydraulic motor 219 on the left as viewed in FIG. 1. Conduit 293 interconnects the hydraulic motor 219 on the left as viewed in FIG. 1 and the hydraulic motor 219 on the right as viewed in FIG. 1. Conduit 294 interconnects the hydraulic motor 219 on the right as viewed in FIG. 1 and the fourth control valve 256, as shown in FIG. 9. Thus, the hydraulic motors 219 are linked in series relation in the hydraulic system 250 through the fourth control valve 256.

The electrical control system of the apparatus 10 of the present invention is generally indicated by the numeral 300 and is shown in FIG. 10. As in the case of the hydraulic system 250, a variety of types of electrical control systems can be employed to operate the apparatus. The electrical control system 300, however, is uniquely well suited to the operation of the apparatus 10, as will be seen. The electrical control system has a control unit 301 mounting a left leg assembly control switch 302 and a right leg assembly control switch 303. An hydraulic motor control switch 304 is mounted on the control unit adjacent to a secondary hydraulic cylinder control switch 305. Each of the control switches 302, 303, 304 and 305 is of the three position type having a central open position, in which no electrical energy flows through the switch, and two closed positions, in which electrical energy flows through the switches as will hereinafter be described.

The control unit 302 is connected to a source of electrical energy, not shown, such as carried by the tractor 14, by a first electrical cable assembly 306 interconnecting the source and the control unit. A second electrical cable assembly 307 interconnects the control unit and the various operative components of the apparatus 10 hereinafter to be described. The control unit bears suitable indicia 308 to indicate the various operative positions for the control switches in operating the apparatus. As shown in FIG. 10, a ground connection is indicated at 309. The various functions of the apparatus 10 are controlled through operation of the control valves 253, 254, 255 and 256. These control valves are operated by electrical solenoids. Thus, electric solenoid 310 is mounted on and in controlling relation to the first control valve 253. Electric solenoid 311 is mounted on and in controlling relation to the second control valve 254. Electric solenoid 312 is mounted on and in controlling relation to the third control valve 255. Electric solenoid 313 is mounted on and in controlling relation to the fourth control valve 256. Each of the electric solenoids 310, 311, 312 and 313 is grounded as indicated in FIG. 10.

As shown in FIG. 10, the electrical control system 300 includes an electrical conductor 320 which extends through the first cable assembly 306 from the source of electrical energy, not shown, to a position within the control unit 301. An electrical conductor 321 is connected to electrical conductor 320 and interconnects the left leg assembly control switch 302 and right leg assembly control switch 303. Electrical conductor 322 interconnects electrical conductor 321 and an electrical conductor 323. Electrical conductor 323 interconnects the hydraulic motor control switch 304 and the secondary hydraulic cylinder control switch 305.

As shown in FIG. 10, an electrical conductor 324 interconnects hydraulic motor control switch 304, extends through the second electrical cable assembly 307 and is connected at its remote end to electric solenoid 313. Electrical conductor 325 interconnects electric solenoid 313 and hydraulic motor control switch 304. Electrical conductor 326 interconnects secondary hydraulic cylinder control switch 305 and electric solenoid 312. Electrical conductor 327 interconnects electric solenoid 312 and secondary hydraulic cylinder control switch 305.

As shown in FIG. 10, an electrical conductor 328 interconnects left leg assembly control switch 302 and electric solenoid 311. Electrical conductor 329 interconnects electric solenoid 311 and left leg assembly control switch 302. Electric conductor 330 interconnects right leg assembly control switch 303 and electric solenoid 310. Electrical conductor 331 interconnects electric solenoid 310 and right leg assembly control switch 303. Electrical conductor 332 interconnects the source of electrical energy, not shown, and the ground connection 309 extending through the first and second electrical cable assemblies 306 and 307. As shown in FIG. 10, electrical conductor 332 is grounded to the control unit 301.

OPERATION

The operation of the described embodiment of the subject invention is believed to be clearly apparent and is briefly summarized at this point. With the hitch 47 of the apparatus 10 connected to the tractor 14 in trailing relation, and with the apparatus adjusted to the configuration shown in FIG. 1, the apparatus can be towed along roadways, paths and the like without difficulty. In order to interconnect the apparatus and the tractor for operating the various systems of the apparatus, the couplings 257 and 263 of the hydraulic system 250 are individually connected to the corresponding couplings, not shown, of the hydraulic system of the tractor. Similarly, the first electrical cable assembly 306 is connected to the source of electrical energy, not shown, of the tractor.

In order to adjust the apparatus to the configuration shown in FIG. 1 wherein the work implements 190 thereof are disposed in first transport positions in side-by-side, substantially parallel relation, the operator depresses the secondary hydraulic cylinder control switch 305 from the open central position to the position causing electrical energy to flow from the source borne by the tractor, through control switch 305, along electrical conductor 327 to activate the electric solenoid 312. This position for the switch is indicated on the control unit 301 by the indicia 308 "up". The electric solenoid 312 operates the third control valve 255 to cause all four of the secondary hydraulic cylinders 165 to be contracted thereby raising the lower linking arms 140 and the work implements 190 borne thereby. When the work implements have been raised thereby to the desired elevation from the ground, the control switch 305 is returned to the central opened position.

Subsequently, the left and right leg assembly control switches 302 and 303 respectively are moved to the positions marked by the indicia 308 as "in". This causes electrical energy to flow along electrical conductors 330 and 328 to activate the electric solenoids 310 and 311. These electric solenoids operate their respective first and second control valves 253 and 254 to contract the primary hydraulic cylinders 104. Thus, the leg assemblies 90 are retracted to the positions shown in FIG. 1 to draw the work implements into the side-by-side positions shown therein. While this contraction of the primary hydraulic cylinders and the corresponding retraction of the leg assemblies 90 can be performed when the apparatus is stationary, it is most convenient to perform this operation while the tractor and apparatus are moving forwardly so that scraping of the wheel assemblies 97 along the ground is minimized.

The operation of the apparatus 10 in positioning the work implements 190 thereof can best be visualized in FIGS. 1, 6, 7 and 8. When the primary hydraulic cylinders 104 are contracted, the slide portions 91 of the leg assemblies are slidably retracted within their respective first and second tubular beams 55 and 56. During this operation the polyethylene bearings 82 and 94 ease such slidable movement. Such inward movement of the leg assemblies similarly moves the subframes 110 of the apparatus toward the center of the apparatus. The pivot arms 230 are rigid between their respective arm mounts 68 of the main frame 20 and arm mounts 136 of the subframes and permit only pivotal movement at the points of interconnection with their respective arm mounts about the pin assemblies 232 and 235. As a result, inward movement of the leg assemblies causes the pivot arms to exert force against the rearward portions of the subframes 110 and thus pivot the subframes about their respective pivot shafts 100 on the leg assemblies. Since the work implements 190 are mounted on the subframes, this in turn pivots the work implements toward positions parallel and adjacent to each other as the leg assemblies are drawn toward each other. Once the primary hydraulic cylinders 104 are fully contracted, the implements are disposed in substantially parallel, side-by-side relation as shown in FIG. 1. Thereafter, the tractor 14 can be employed to pull the apparatus 10 along roadways and through confined areas in transport to or from the area of use.

Figure 6:
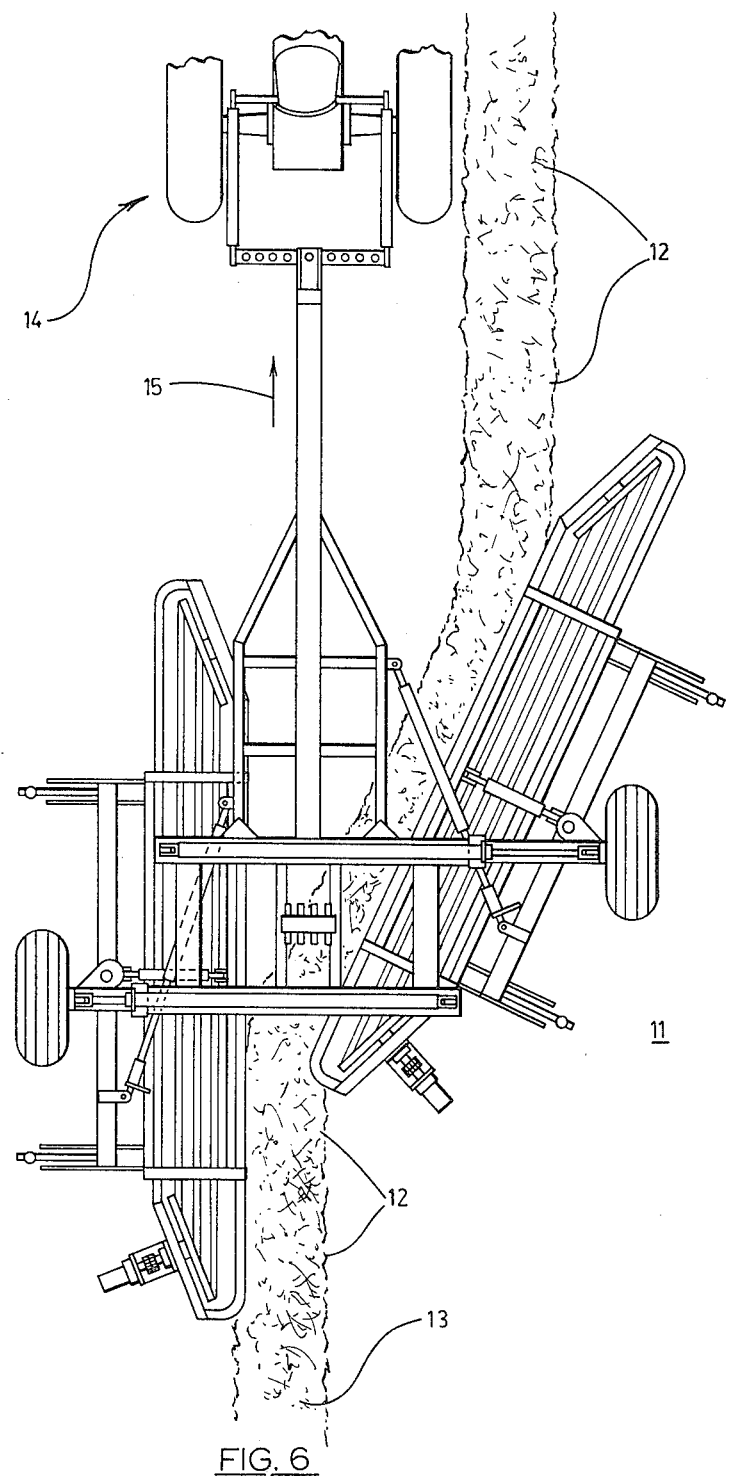
FIG. 6 is a top plan view of the apparatus shown in an illustrative environment with the work implements thereof disposed in a first operative configuration.
Figure 7:
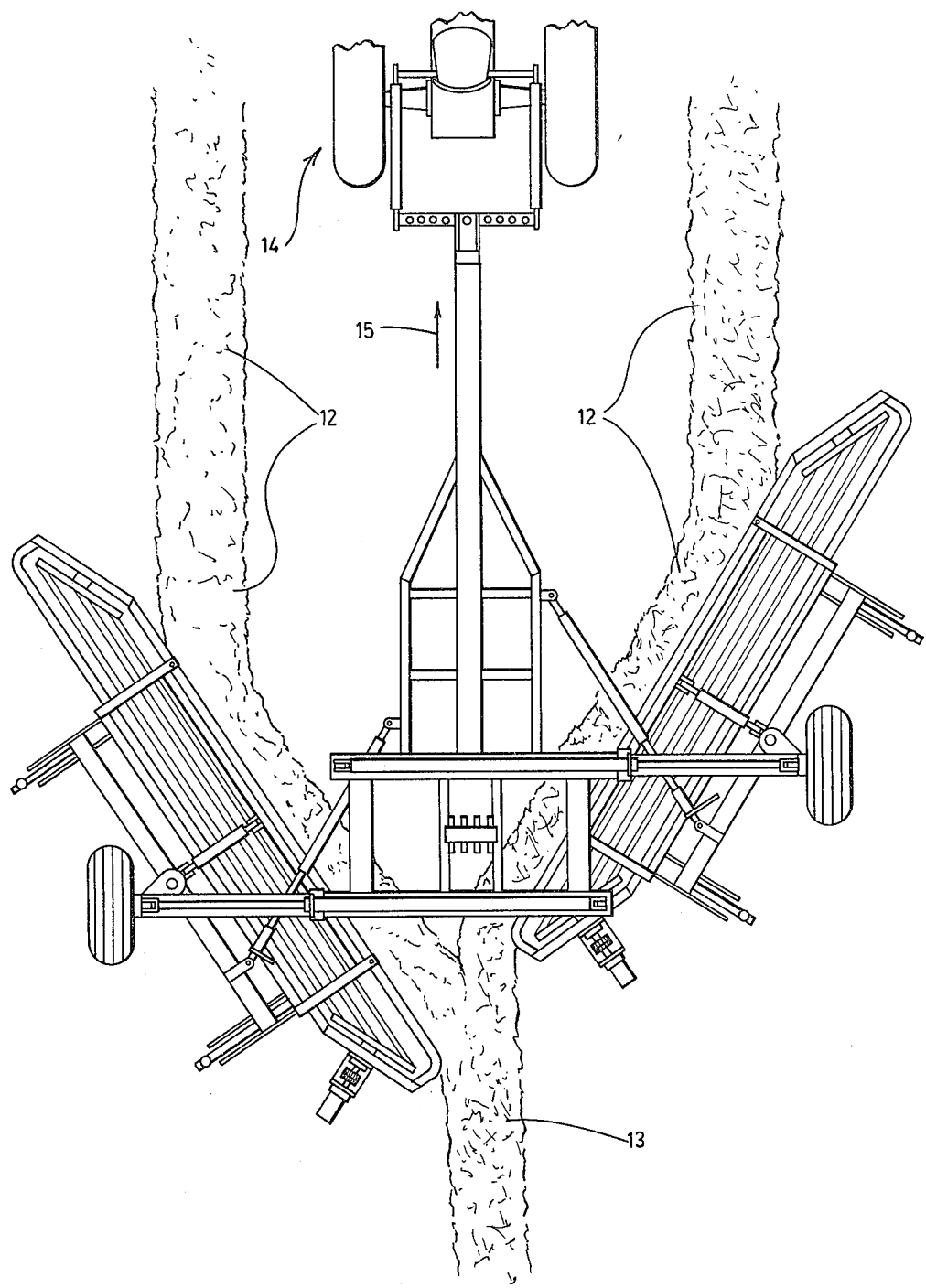
FIG. 7 is a top plan view of the apparatus shown in an illustrative environment with the work implements thereof disposed in a second operative configuration.
Figure 8:
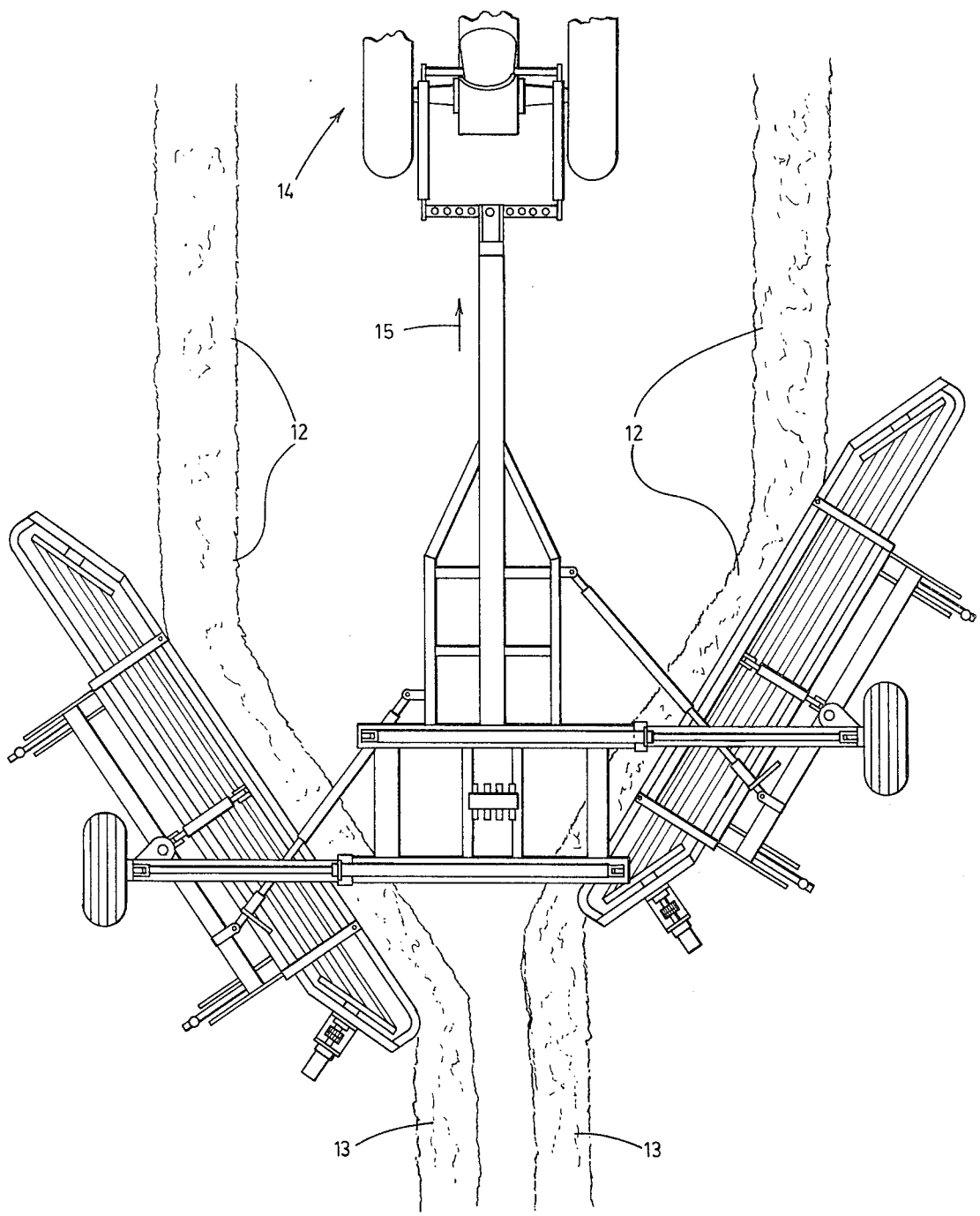
FIG. 8 is a top plan view of the apparatus shown in an illustrative environment with the work implements thereof disposed in a third operative configuration.

Once the field has been reached, the apparatus can be adjusted to any of the plurality of operative configurations specifically adapted for the work to be performed. FIGS. 6, 7 and 8 show three examples of operative configurations designed to perform different specific work operations. However, it will be understood that a virtually infinite number of relationships for the work implements can be created and those shown in FIGS. 6, 7 and 8 are intended merely to be illustrative of such operative configurations.

As shown in FIGS. 6, 7 and 8, the work implements 190 are off set relative to each other so that the rear end portions 212 thereof are similarly off set. This provides clearance for adjusting the work implements relative to each other. In addition, this off set allows cooperative operation of the work implements such as can be visualized in FIG. 6 wherein the windrow 13 is overturned against the work implement on the left so as to prevent further tumbling of the windrow.

Adjustment of the apparatus 10 to any of the various configurations, is performed using the control unit 301 in a manner similar to that already described. Thus, in order to adjust the apparatus from the configuration shown in FIG. 1 to the configuration shown in FIG. 6, the operator depresses the right leg assembly control switch 303 to the "out" position indicated by indicia 308. This causes the electric solenoid 310 to operate the first control valve 253 to expand the primary hydraulic cylinder 104 on the first tubular beam 55. The leg assembly 90 of the first tubular beam is thereby moved laterally outwardly from the main frame 20. Such outward movement causes the pivot arm 230 to swing the subframe 110 in a clockwise direction about the pivot shaft 100 and thereby to pivot the work implement 190 about the axis thereof and into oblique attitude with respect to the direction of travel indicated by arrow 15. When the desired position has been reached for the work implement 190, the operator simply returns the right leg assembly control switch 303 to the neutral opened position thereby terminating operation of the electric solenoid 310 and terminating operation of the control valve 253 to stop expansion of the hydraulic cylinder 104 on the first tubular beam 55. The left work implement 190 is retained in the position already described substantially parallel with respect to the intended direction of travel.

Subsequently, the operator moves the secondary hydraulic cylinder control switch 305 to the "down" position indicated by indicia 308. This operates the electric solenoid 312 to, in turn, operate the third control valve 255 to expand the secondary hydraulic cylinders 165 on the subframes 110 thereby moving the lower linking arms 140 about their respective first pivot points 145 in a generally downward direction. The linkage composed of the lower linking arms 140 and the upper linking arm 155 causes the implement to be lowered along its path to the desired position. When the desired position has been reached which ordinarily is when the tines, not shown, of the raking reels 213 are in or near ground engagement, the secondary hydraulic control switch 305 is moved to the neutral opened position to stop the expansion of the secondary hydraulic cylinders.

The cranks 179 of the secondary hydraulic cylinder assemblies 164 are operated to adjust the work implements 190 to the precise desired positions for the specific work operation to be performed. In most instances, this calls for the work implement to be adjusted so that it is perfectly horizontal and thereby so that the tines of the raking reels 213 are in substantially identical positions relative to the earth's surface or field 11. In other instances, it may be desired to cant the work implements at angles relative to the field for any desired purpose. When raking is to be along a raised border, such an adjustment may be desired. Such adjustment is accomplished by operating the adjustment assemblies 172, using the cranks 179, to raise or lower the lower linking arms 140 of the subframe 110 mounting the work implement to be repositioned. Thus, the front end portion 211 and rear end portion 212 of each work implement can be raised or lowered as desired with respect to each other.

It is evident that adjustment of the apparatus 10 to the configuration shown in FIGS. 7 and 8, or to any other desired configuration is accomplished using the control unit 301 substantially as already described with respect to the configuration shown in FIG. 6. In the configuration shown in FIG. 6, the apparatus can be employed to turn a single windrow 13 so that the hay 12 in the windrow is overturned for continued drying. When the apparatus is adjusted to the configuration shown in FIG. 7, a pair of windrows 13 can be overturned and combined to form a single windrow. When the apparatus is adjusted so the configuration shown in FIG. 8, a pair of windrows 13 can be overturned and, in effect, moved to form a pair of windrows disposed in closely spaced relation.

In order to operate the apparatus 10 in any of the adjusted configurations, the operator simply depresses the hydraulic motor control switch 304 to either the "forward" or "reverse" positions indicated by the indicia 308. This causes the electric solenoid 313 to operate the fourth control valve 256 to drive the hydraulic motors 219 in either the forward or reverse directions to drive the raking reels 213 in corresponding directions as desired and selected using the switch 304. It will be understood that rotation of the raking reels in different directions of rotation accomplishes different raking effects. Thereafter, the operator simply operates the tractor 14 to pull the apparatus through the field in performing the desired raking operation.

Since the pivot arms 230 can be adjusted lengthwise using either the fine adjustment assembly 238 or by removing the pin assembly 237 and telescopically, endwardly adjusting the forward tubular portion 231 and the rearward tubular portion 234 relative to each other, a virtually infinite number of raking attitudes can be created. Similarly, the apparatus can be adjusted so that the work implements 190 are disposed at any desired attitudes relative to each other and to the direction of travel indicated by arrow 15 for given positions of expansion or contraction of the leg assemblies 90. Still further, as best shown in FIG. 4, by adjusting the upper linking arm 155 using the adjustment lever 157, each work implement can be canted about its' longitudinal axis to the desired attitude.

When the operator has completed the work operation, the operator simply operates the electrical control system 300, using the control unit 301 as already described, to move the work implements 190 to the adjacent side-by-side relationship shown in FIG. 1 for travel from the field 11.

Therefore, the apparatus of the present invention affords a capability for having one or more work implements which can be adjusted relative to a direction of travel for the performance of a specific work operation, which can easily and conveniently be readjusted relative to each other without substantial rearrangement or disassembly of the work implements in an apparatus which is fully capable of performing all such operations of that type thereby eliminating the necessity of maintaining a plurality of individual devices each only suited to a single operation.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. An apparatus comprising an adjustable frame adapted for earth traversing movement in a direction of travel and having a movable portion adapted for extension and contraction substantially laterally of the direction of travel; a work assembly including a subframe, a work implement, links pivotally interconnecting the subframe and the work implement to mount the work implement for movement along a path toward and from the earth and power means interconnecting the subframe and one of said links for expansion and contraction to move the work implement along said path, said power means including an hydraulic cylinder assembly having a range of expansion and contraction less than the range of movement of the work implement permitted by said links and one end of said hydraulic cylinder assembly is connected to said one of the links, an adjustment assembly mounted on the subframe in supporting relation to the hydraulic cylinder assembly and being adjustable to move the hydraulic cylinder assembly along a path toward and from the subframe and to support the hydraulic cylinder assembly at any selected position in said path, and an hydraulic system operably connected to the hydraulic cylinder assembly selectively operable to expand and alternatively to contract the hydraulic cylinder assembly within said range; means mounting said work assembly on said movable portion of the frame for substantially pivotal movement about a substantially vertical axis through a plurality of attitudes relative to said direction of travel; and control means for moving the work assembly to a selected one of said attitudes in response to predetermined adjustment of the frame.

2. An apparatus having a variable attitude work implement, the apparatus comprising a main frame; a supporting frame borne by the main frame for movement in opposite directions along a predetermined path relative to the main frame; earth traversing means mounted on the supporting frame supporting said frames for earth traversing movement in a direction of travel substantially normal to said predetermined path; a work assembly; means mounting the work assembly on the supporting frame for substantially pivotal movement about a substantially vertical axis through a range of selected positions relative to said direction of travel; a linking arm composed of a pair of slidably interconnected portions one of which is secured on the main frame and the other of which is secured on the work assembly at a position spaced from said substantially vertical axis and the linking arm has means for locking said portions thereof relative to each other to select the distance between the points of connection of the linking arm with the main frame and work assembly thereby to select the desired position for the work assembly within said range for a given position of the supporting frame along said path; and means for selectively moving the supporting frame along said path to cause said linking arm to move the work assembly about the substantially vertical axis and for retaining the supporting frame in a selected position in said path relative to the main frame to retain the work assembly in a selected position in said range.

3. An apparatus having a variable attitude work implement, the apparatus comprising a main frame; a supporting frame borne by the main frame for movement in opposite directions along a predetermined path relative to the main frame; earth traversing means mounted on the supporting frame supporting said frames for earth traversing movement in a direction of travel substantially normal to said predetermined path; a work assembly; means mounting the work assembly on the supporting frame for substantially pivotal movement about a substantially vertical axis through a range of selected positions relative to said direction of travel; a linking arm having a portion secured on the main frame and a portion secured on the work assembly at a position spaced from said substantially vertical axis rearwardly of the vertical axis with respect to said direction of travel of the frames in earth traversing movement; and means for selectively moving the supporting frame along said path to cause said linking arm to move the work assembly about the substantially vertical axis and for retaining the supporting frame in a selected position in said path relative to the main frame to retain the work assembly in a selected position in said range whereby movement of the supporting frame in a direction from the main frame along said path causes the work assembly to be moved through the range of selected positions from a position substantially parallel to the direction of travel toward a position substantially normal to the direction of travel.

4. An apparatus having a variable attitude work implement, the apparatus comprising a main frame; a supporting frame borne by the main frame for movement in opposite directions along a predetermined path relative to the main frame; earth traversing means mounted on the supporting frame supporting said frames for earth traversing movement in a direction of travel substantially normal to said predetermined path; a work assembly including a subframe borne by the supporting frame of the apparatus for substantially pivotal movement about a substantially vertical axis through a range of selected positions relative to said direction of travel, a work implement, links pivotally interconnecting the subframe and the work implement to mount the work implement for movement along a path to and from earth engagement and means mounted on the subframe and secured on one of said links for moving the work implement along said path and for retaining the work implement at a selected position in said path; a linking arm having a portion secured on the main frame and a portion secured on the work assembly at a position spaced from said substantially vertical axis; and means for selectively moving the supporting frame along said path to cause said linking arm to move the work assembly about the substantially vertical axis and for retaining the supporting frame in a selected position in said path relative to the main frame to retain the work assembly in a selected position in said range.

5. The apparatus of claim 4 wherein the moving means includes:
(1) an hydraulic cylinder assembly having a range of expansion and contraction less than the range of movement of the work implement permitted by said links and one end of said hydraulic cylinder assembly is connected to said one of the links;
(2) an adjustment assembly mounted on the subframe in supporting relation to the hydraulic cylinder assembly and being adjustable to move the hydraulic cylinder assembly along a path toward and from the subframe and to support the hydraulic cylinder assembly at any selected position in said path; and
(3) an hydraulic system operably connected to the hydraulic cylinder assembly selectively operable to expand and alternatively to contract the hydraulic cylinder assembly within said range.

6. An apparatus having variable attitude work implement, the apparatus comprising:
A. a main frame having a pair of tubular members disposed in spaced, substantially parallel relation and a hitch adapted for use in pulling the main frame in earth traversing movement in a forward direction of travel substantially normal to the tubular members;
B. a pair of leg assemblies, having slide portions individually slidably received in the tubular members and leg portions individually mounted on the slide portions extending downwardly therefrom on opposite sides of the main frame;
C. a pair of wheel assemblies individually mounted on the leg portions of the leg assemblies supporting the main frame for said earth traversing movement along the path of travel;
D. a pair of subframes individually mounted on the leg portions of the leg assemblies for individual pivotal movement about a substantially vertical axis;
E. a pair of work implements individually mounted on the subframes for movement therewith;
F. a pair of pivot arms individually connected to the main frame and individually connected to the subframes at points rearwardly of said substantially vertical axes thereof with respect to the forward direction of travel of the main frame; and
G. an hydraulic system having a pair of hydraulic cylinders mounted on the main frame with portions individually secured on the leg assemblies selectively operable to expand and alternatively to contract to move the slide portions of the leg assemblies within the tubular members of the main frame causing the pivot arms to pivot the subframes and work implements borne thereby about their respective substantially vertical axes and into individual attitudes relative to said direction of travel for performing a selected work operation with said work implements.

7. The apparatus of claim 6 wherein said work implements are rakes borne by their respective subframes in positions such that when the hydraulic cylinders are fully contracted the rakes are disposed in attitudes substantially parallel to said direction of travel and adjacent to the main frame and as the hydraulic cylinders are expanded from said fully contracted condition the portions of the rakes nearest the hitch of the main frame are moved from the main frame individually toward positions right angularly related to the direction of travel.

8. The apparatus of claim 7 wherein one of the rakes is off set forwardly of the other of said rakes with respect to the direction of travel to provide clearance for movement of the portions of the rakes farthest from the hitch relative to each other as the rakes are moved toward positions right angularly related to the direction of travel and to provide an off set of said portions of the rakes for forming a windrow during use of the apparatus.

9. The apparatus of claim 6 wherein a linkage mounts each work implement on its respective subframe for movement along a path to an from earth engagement and a secondary hydraulic cylinder assembly is mounted on each subframe, is secured on the linkage thereof and is operable selectively to position the work implement in said path and to retain the work implement in the position selected during use of the apparatus.

10. The apparatus of claim 9 wherein the linkage of each work implement includes a lower link mounted on the subframe for pivotal movement about a first pivot point and mounted on the work implement for pivotal movement about a second pivot point, and the secondary hydraulic cylinder assembly includes a secondary hydraulic cylinder, having a range of expansion and contraction less than the length of said path, having an end portion secured on the lower link and an opposite end portion mounting an adjustment assembly which is mounted on its respective subframe and endwardly adjustable to position the secondary hydraulic cylinder and thus the range of adjustment of the work implement in said path.

11. The apparatus of claim 10 wherein said end portions of each second hydraulic cylinder is secured on its respective lower link at a point more than one half the distance from the first pivot point to the second point of the lower link.

12. The apparatus of claim 6 wherein the main frame has tubular beam extending forwardly of the work implements with respect to the direction of travel and mounting the hitch thereon, said tubular beam having walls therewithin spaced from each other and sealed to form an hydraulic fluid reservoir therebetween to which the hydraulic system is operably connected.

13. The apparatus of claim 6 wherein each pivot arm is composed of portions slidably interconnected for selected adjustment of the length of the pivot arm and said portions mount means for lockably interconnecting the portions in a selected adjustment similarly to select the attitude to which the work element thereof is moved by a selected operation of its respective hydraulic cylinder.

14. The apparatus of claim 6 wherein the hydraulic system has a control for independent operation of the hydraulic cylinders for independently positioning the work implements thereof.

15. The apparatus of claim 10 wherein the linkage of each work implement includes a pair of said lower links individually interconnecting the subframe and the work implement adjacent to opposite ends of said work implement, a pair of said secondary hydraulic cylinder assemblies are borne by and individually interconnect each subframe and said lower links and each of said secondary hydraulic cylinder assemblies has one of said adjustment assemblies, the adjustment assemblies being operable independently to control the positions of the opposite ends of each work implement relative to each other and the positions of the work implements relative to each other in their respective paths.

16. An apparatus comprising a main frame; a pair of leg assemblies mounted on the main frame and having ground engaging wheels individually mounted on predetermined portions of the leg assemblies supporting the main frame for earth traversing movement in a predetermined direction of travel, one of said leg assemblies being movable relative to the main frame along a path laterally of the main frame; a work assembly mounted on said predetermined portion of the movable leg assembly for substantially pivotal movement about a substantially vertical axis substantially at the position of said mounting of the work assembly and relative to the wheel thereof through a range of positions between a first transport position substantially parallel to the direction of travel and a second position obliquely disposed with respect to said direction of travel; means for moving the leg assembly along said path; and means for moving said work assembly about the substantially vertical axis and for retaining the work assembly in one of the positions within said range.

17. The apparatus of claim 16 wherein both of said leg assemblies are individually movable along individual paths substantially normal to the direction of travel and on opposite sides of the main frame, a work assembly is mounted on each leg assembly for individual substantially pivotal movement about individual substantially vertical axes, said leg assembly moving means is operable to move the leg assemblies along said paths and the work assembly moving means includes means for moving said work assemblies about the substantially vertical axes.

18. The apparatus of claim 7 wherein said leg assemblies are mounted on the frame in such a manner that said individual paths of movement of the leg assemblies are offset from each other relative to said direction of travel and mount said work assemblies in said offset relation to each other.

19. An apparatus comprising a main frame; a pair of leg assemblies mounted on the main frame and having ground engaging wheels individually mounted on predetermined portions of the leg assemblies supporting the main frame for earth traversing movement in a predetermined direction of travel, said leg assemblies being individually movable relative to the main frame along individual paths laterally of and on opposite sides of the main frame; work assemblies individually mounted on said predetermined portions of the leg assemblies for substantially pivotal movement about individual substantially vertical axes substantially at the positions of said mounting of the work assemblies relative and individually adjacent to the wheels of their respective leg assemblies, each through a range of positions between a first transport position substantially parallel to the direction of travel and a second position obliquely disposed with respect to said direction of travel; means for individually moving the leg assemblies along their respective paths; and means for individually moving said work assemblies about their respective vertical axes and for retaining the work assemblies in individually selected positions within their respective ranges of positions.

20. An apparatus comprising a frame mounting wheels supporting the frame for earth traversing movement; a work implement; links pivotally interconnecting the frame and the work implement mounting said work implement for movement along a path toward and from the earth; and power means interconnecting the frame and one of said links for pivoting said link selectively to move the work implement along said path, the power means including a hydraulic cylinder assembly having a range of expansion and contraction less than the range of movement of the work implement in said path permitted by the links, an adjustment assembly mounted on the hydraulic cylinder operable to lengthen or alternatively to shorten the overall effective length of said adjustment assembly and hydraulic cylinder assembly and said adjustment assembly and hydraulic cylinder assembly interconnecting the frame and said one of said links, and an hydraulic system operably connected to said hydraulic cylinder assembly whereby said hydraulic cylinder assembly can be expanded to its maximum extent of expansion, the adjustment assembly operated to position the work implement in the desired work position relative to the earth with the hydraulic cylinder assembly in said expanded condition and thereafter the hydraulic system operated to move the work implement to and from said work position by said expansion and contraction of the hydraulic cylinder assembly.

* * * * *